United States Patent [19]

Sproull

[11] Patent Number: 4,771,019

[45] Date of Patent: Sep. 13, 1988

[54] LOW BORON GLASS FIBERS WITH LOW INDEX OF REFRACTION

[75] Inventor: James F. Sproull, Sarver, Pa.

[73] Assignee: PPG Industries, Inc., Pittsburgh, Pa.

[21] Appl. No.: 913,603

[22] Filed: Sep. 29, 1986

Related U.S. Application Data

[63] Continuation of Ser. No. 683,741, Dec. 19, 1984, abandoned.

[51] Int. Cl.$^4$ .......................... C03C 13/04; C03C 4/00
[52] U.S. Cl. .......................................... 501/37; 501/35; 501/38; 501/59; 501/66; 501/70; 501/903
[58] Field of Search ................... 501/900, 903, 35, 37, 501/38, 70, 66, 59

[56] References Cited

U.S. PATENT DOCUMENTS

| | | | |
|---|---|---|---|
| 2,334,961 | 11/1943 | Schoenlaub | 106/35 |
| 2,571,074 | 10/1951 | Tiede et al. | 501/35 |
| 2,853,393 | 9/1958 | Beck et al. | 106/47 |
| 2,944,994 | 7/1960 | Singleton et al. | 260/40 |
| 3,095,311 | 6/1963 | von Wranau et al. | 106/35 |
| 3,687,850 | 8/1972 | Gagin | 501/35 |
| 3,847,626 | 11/1974 | Erickson et al. | 106/38 |
| 3,847,627 | 11/1974 | Erickson et al. | 106/38 |
| 3,876,481 | 4/1975 | Erickson et al. | 106/35 |
| 3,881,945 | 5/1975 | Trojer et al. | 501/38 |
| 3,945,838 | 3/1976 | Erickson et al. | 106/38 |
| 4,046,948 | 9/1977 | Zlochower | 501/35 |
| 4,066,466 | 1/1978 | Neely, Jr. | 106/35 |
| 4,110,094 | 8/1978 | Motsinger et al. | 65/3.44 |
| 4,166,747 | 9/1979 | Neely, Jr. | 106/35 |
| 4,199,364 | 4/1980 | Neely | 106/35 |

FOREIGN PATENT DOCUMENTS

| | | | |
|---|---|---|---|
| 57-3736 | 1/1982 | Japan | 501/38 |
| 57-77043 | 5/1982 | Japan | 501/38 |
| 77042 | 5/1982 | Japan | 501/66 |
| 197811 | 11/1978 | United Kingdom | 501/35 |

Primary Examiner—Mark L. Bell
Assistant Examiner—A. Knab
Attorney, Agent, or Firm—Kenneth J. Stachel

[57] ABSTRACT

Reduced boron containing glass fibers are provided which have a refractive index similar to that of higher boron-containing glass fiber compositions. The glass fibers with a refractive index in the range of greater than 1.5495 to around 1.57 have in weight percent $SiO_2$ - 55–56.5, CaO - 20–23, $Al_2O_3$ 14.5–15.5, $B_2O_3$ - 5 to 5.8, $R_2O$ - 1–1.5, wherein R is an alkali metal and $F_2$ - 0.4 to 0.6. In addition, the glass fiber composition can have minor constituents such as $TiO_2$ of up to around 0.6 weight percent and an MgO of up to around 0.3 weight percent and ferric oxide of up to around 0.3 weight percent. Basically, the glass fibers have a reduced content of both $B_2O_3$ and CaO over standard glass fiber compositions such as E-glass and 621-glass and also has elevated amounts of alkali and of refractory constituents such as $SiO_2$ and $Al_2O_3$. The glass fibers are formed with an elevated temperature of 40° to 50° F. (22°–28° C.) above the temperature used to form glass fibers from E-glass and 621-glass.

8 Claims, No Drawings

LOW BORON GLASS FIBERS WITH LOW INDEX OF REFRACTION

This application is a continuation of application Ser. No. 683,741, filed Dec. 19, 1984, abandoned.

The present invention is directed to a nascent glass fiber composition having a reduced boron content but having a refractive index comparable to higher boron containing glass fiber compositions.

Glass fibers in industrial use today involve around 4 or 5 major glass compositions with the bulk of the glass fibers having the "E-glass" or "621-glass" composition. E-glass is generally described in U.S. Pat. No. 2,334,961, and typically has a glass composition in weight percent as follows: $SiO_2$ 52–56, $Al_2O_3$ 12–16%; CaO 16–19%; MgO 3–6%, and $B_2O_3$ 9–11%. The "621-glass" is a modification of the typical "E-glass" formulation and is usually devoid of MgO with a CaO content much higher than that of "E-glass". The "621-glass" is described in more detail in U.S. Pat. No. 2,571,074 and generally has the composition in weight percent as follows: $SiO_2$ 52–56, $Al_2O_3$ 12–16, CaO 19–25% and $B_2O_3$ 8–13%. In addition to the aforelisted components of the "E-glass" and "621-glass", minor constituents can also be present. These constituents are typically $F_2$, $Fe_2O_3$, $K_2O$, $Na_2O$, and on occasion BaO and MgO in the case of "621" glass. In general, these minor constituents are present each in an amount of less than 1% by weight in the glass.

The "E-glass" and "621-glass" fiber compositions have found myriad applications of the continuous glass fiber field. An example of one such application is the reinforcement of polymeric materials, for example, in producing glass fiber reinforced plastic panels. In this product line the panels for exterior use are preferably unhazy, translucent, and have a bluish hue.

In producing glass fibers, the current trend is to reduce the amount of boron in the glass fiber composition and, thereby, in the process of manufacturing the glass fibers. Benefits realized from such a reduction are both environmental and economic. A problem in the reduction of boron in glass fibers used for reinforcing polymeric materials and especially the production of glass fiber reinforced plastic panels is the difficulty in obtaining unhazy, translucent panels with a bluish hue from glass fibers having a lower boron content. The refractive index of the "E-glass" and "621-glass" is around 1.557. On reducing the boron content of the glass fibers, the refractive index of the glass fibers increases to 1.625 or more. In the application of glass fiber reinforced plastic panels, the higher refractive index of the glass tends to give an undesirable bronze transmitted color to the glass fiber reinforced panels. Also, the reduction of boron content of the glass fibers must be performed with care, since the $B_2O_3$ is a fluxing agent. With the reduction of the fluxing agent, various properties of the glass fibers such as softening point, viscosity and fiberizability can be detrimentally affected.

It is an object of the present invention to provide glass fibers having a lower boron content but having a refractive index similar to higher boron containing glass fibers, where the refractive index is in the range of greater than 1.5495 to 1.57.

As a further object of the present invention to provide glass fibers having a refractive index that closely matches a majority of the polymeric materials used in fabricating glass fiber reinforced plastic panels that are translucent, and that are unhazy and that have a bluish tint.

SUMMARY OF THE INVENTION

The glass fiber composition of the present invention is chiefly comprised of the following components in an amount in the indicated ranges of weight percentages of the glass composition, as follows: $SiO_2$ 55–56.5; $Al_2O_3$ 14.5–15.5; $B_2O_3$ 5 to 5.8 weight percent, $R_2O$ 1–1.5, where R is an alkali metal; and $F_2$ 0.4 to 0.5. In addition, the glass composition can have minor constituents such as $TiO_2$ around 0.6 weight percent, MgO around 0.3 weight percent, and $Fe_2O_3$ around 0.3 weight percent.

A method of producing glass fibers having a reduced boron concentration without increasing the refractive index of the glass fibers involves formulating a glass-forming material that will yield glass fibers having a decreased amount of both the boron $B_2O_3$ and calcium oxide CaO having an increased amount of both refractive constituents, $SiO_2$ and $Al_2O_3$, and having an increased amount of alkali; and forming the glass fibers at a higher temperature of around 40° to 50° F. (22° C.–28° C.) above the typical higher $B_2O_3$ level, "E-glass and 621-glass" forming temperatures for the same log viscosity of the glasses.

DETAILED DESCRIPTION OF THE INVENTION AND PREFERRED EMBODIMENT

In producing glass fibers, it is important to maintain a specific temperature-viscosity relationship. The viscosity is regulated by maintaining control of the glass composition. The viscosity for drawing fibers generally is controlled to be in the range of about 100 ($10^2$) to 1,000 ($10^3$) Poise. Also the temperature of fiber forming from the glass should be maintained at least 100° F. (55.5° C.) higher than the liquidus temperature. The liquidus temperature is that temperature under equilibrium conditions above which the glass exists as a liquid and below which the glass is transformed to a crystalline state.

In the "E-glass" and "621 glass" compositions, a glass former in addition to silica is boron oxide, which is also a fluxing agent in the production of glass fibers, and which also assists in achieving a low refractive index. In reducing the boron content in glass fibers while continuing to maintain the right temperature viscosity characteristics, it would be necessary to add an additional fluxing agent or increase the amount of an existing fluxing agent. It is desirable to have some boron oxide present in the glass thereby reducing the need to provide a completely new source of fluxing agent. The complete removal of boron oxide from the glass adversely affects properties other than the refractive index. Other properties for "E-glass" and "621-glass" which are desired in industry are chemical durability, alkali resistance, electrical resistance, pristine strength, liquidus temperature and softening point temperature. Hence, achieving a proper refractive index for low boron-containing glass fibers having an amount of boron oxide in the range of about 5 to about 5.8 and with suitable properties like "E-glass" and "621 glass" is an involved undertaking. But, arriving at a suitable fluxing agent or agents, while maintaining the desired glass properties involves proper interpretation of various factors. For instance, calcium oxide (CaO) which is already present in an "E-glass" or "621-glass" composition can serve as a fluxing agent, but increasing the calcium oxide concomitantly increases the refractive index of the glass fibers.

Also, in producing the unhazy glass fiber reinforced translucent panels, it is important that the refractive index of the glass substantially match the refractive index of the polymeric resin used as the matrix in producing the panels. If the refractive indices are too far apart, the resulting glass fiber reinforced panel can be hazy. In producing the panel, the refractive index of the resin decreases upon heating, while the glass refractive index remains stable so that, when the refractive index of the heated resin matchs the refractive index of the glass, the glass fiber reinforced panel is clear. Further heating decreases the resin refractive index below that of the glass and the glass fibers would become prominent in the glass fiber reinforced panel. On cooling the glass fiber reinforced panel, when the resin refractive index is higher than the glass, the scattered light is mostly blue, but when the resin refractive index is below the glass's refractive index, the scattered light is more in the yellow range. To closely match the refractive index of the glass to that of the matrix polymer for producing glass fiber reinforced polymers and especially glass fiber reinforced translucent panels, the refractive index of the glass should be in the range of greater than 1.5495, preferably 1.553 and up to 1.557.

The glass fiber composition of the present invention provides all of the characteristics necessary for producing glass fibers that can be used in producing translucent glass fiber reinforced plastic panels.

The glass fiber composition of the present invention is produced from any batch ingredients known to those skilled in the art to achieve the glass fiber composition of Table 1. Also any calculation method can be used that is known to those skilled in the art for back calculating from targeted oxides like those in the glass fiber composition of Table 1 to a direct batch composition or a batch composition for marbles. The latter feed material is useful in an indirect melting process to produce glass fibers.

TABLE 1

| Components | Broad Weight Percentage Range of Amounts | Preferred Weight Percentage Amounts |
|---|---|---|
| SiO$_2$ | 55–56.5 | 55.8% |
| CaO | 20–23 | 21.0 |
| Al$_2$O$_3$ | 14.5–15.5 | 14.8 |
| B$_2$O$_3$ | 5–5.8 | 5.2 |
| Na$_2$O | 1–1.5 | 1.4 |
| F$_2$ | 0.4–0.6 | 0.5 |

In general, the glass fibers can be produced having the glass composition of the present invention by any method known to those skilled in the art. A nonexclusive example includes mechanical attenuation from a bushing from which molten streams of glass are pulled through the orifices in the bushing. The glass fibers when cooled sufficiently have an aqueous sizing composition applied to their surfaces to protect the fibers from interfilament abrasion, when gathered into one or more strands and collected. In another example, the glass fibers can be formed by introducing the glass into a rotary spinner through a conduit and ejecting the glass fibers through apertures as fibers. Here the fibers are further attenuated by hot gases originating from burners located in proximity to the rotating spinner. The glass fibers are sprayed with a sizing composition and disposed as a mat on a conveyor moving under the rotary spinner. In forming the glass fibers with the glass composition of the present invention, the temperature of forming is generally higher than that required for E-glass or 621-glass, to give a desired high temperature viscosity in the range of log 2.5 to log 3.0. The higher temperature is a function of the amount of the reduction in boric oxide in the glass fiber composition. When the boric oxide (B$_2$O$_3$) is around 5.2% of the glass fiber composition, the temperature is increased around 40° to 50° F. (22° C. to 28° C.), while corresponding temperature increases will be required for lower amounts of boric oxide in the glass fiber composition. The temperature increase of 40° to 50° F. is usually in the temperature range of 2576° F. to 2218° F. for log viscosity of 2.0 to 3.0. Also temperature increases of a lesser degree would be necessary for producing glass fibers with amounts of boric oxide above 5.2 weight percent up to 5.8 weight percent.

Any aqueous sizing composition known to those skilled in the art can be applied to the glass fibers. For example, the sizing composition of U.S. Pat. No. 4,110,094, hereby incorporated by reference, can be used. In producing unhazy, translucent, glass fiber reinforced panels for exterior use, it is preferred to have an aqueous glass fiber sizing composition having the aqueous treating composition having four principal nonaqueous components. One nonaqueous component is one or more aqueous soluble, dispersible or emulsifiable bisphenol A type polyester film forming polymer alone or in a blend with an epoxy-containing, where the the polymers are film forming polymer compatible with and soluble in the matrix polymer. Another nonaqueous component is one or more acryloxy- or methacryloxy-containing organo coupling agents. An additional nonaqueous component is one or more cationic filament lubricants, for instance, polyalkylene amines partially amidated with fatty acids at least one of which is pelargonic acid. Another nonaqueous component is one or more organic nitrogenated cationic quaternary ammonium salt antistatic agents in an effective antistatic amount. The composition is essentially free of inorganic antistatic agents and hydrogenated vegetable oil. The amount of water in the composition allows the glass fibers to be treated with the aqueous treating composition. In addition, the aqueous composition can have a strand hardening agent. The predominant amount of the nonaqueous components is comprised of the film forming polymer, while the organo coupling agent and lubricant are present in effective amounts for coupling and lubricating, respectively. The effective antistatic amount of antistat is in the range of about 0.05 to about 0.4 weight percent of the aqueous treating composition. A suitable preferred aqueous sizing composition is that shown in Table 2.

TABLE 2

| Component | Wt. in grams | Wt. % Solids | Weight of Aqueous Treating Composition |
|---|---|---|---|
| Gamma-methacryloxy-propyltrimethoxy silane | 380 | 2.8 | 0.16 |
| Acetic acid | 25 | — | 0.01 |
| Water for silane | 22720 | — | — |
| Cationic glass fiber lubricant (Emery ® 6717 lubricant) | 151.5 | 1.4 | 0.08 |
| Water for lubricant | 1895 | — | — |
| Aqueous emulsion of bisphenol A type polyester polymer (Neoxil ® 954 resin) | 22,720 | 95.4 | 5.5 |
| Organic quaternary ammonium antistat | 284 | 2.6 | 0.15 |

TABLE 2-continued

| Component | Wt. in grams | Wt. % Solids | Weight of Aqueous Treating Composition |
|---|---|---|---|
| Neoxil ® AO-5620 | | | |
| Water to result in volume of 50 gallons | 2,500 | — | — |

The sized glass fibers are collected into one or more strands of any construction known to those skilled in the art like H-55 or K-37 strands and wound into a forming package or into a roving package, or chopped as wet chopped strands. The glass fiber strands chopped or in a package of strands are dried to reduce their moisture content. The dried glass fibers are usually dried at a temperature in the range of about 230° F. to about 280° F. (110° C.–138° C.). The dried glass fibers are suitable for reinforcing polymeric materials and the continuous lengths of glass fiber strands can be chopped as dry chopped glass fibers for use in reinforcing polymeric materials. In forming glass fiber reinforced panels for exterior use, the glass fiber strands are dry chopped in the process of producing the panels.

In producing the glass fibers with the low boron content from about 5.0 to about 5.8 weight percent, while the glass fibers also have a refractive index in the preferred range of greater than 1.5530 up to around 1.5570, the glass fibers are preferably produced from the batch composition with amounts in grams as follows:

| | |
|---|---|
| Sand | 1131 |
| Clay | 1099 |
| Limestone | 1053 |
| Boric Acid | 301 |
| Fluorspar | 63.4 |
| Salt Cake | 11.3 |
| Soda Ash | 56.8 |

This batch composition yields glass fibers having the following preferred glass fiber composition.

| | |
|---|---|
| $SiO_2$ | 55.8% |
| CaO | 21.0 |
| $Al_2O_3$ | 14.8 |
| $B_2O_3$ | 5.2 |
| $Na_2O$ | 1.4 |
| $F_2$ | 0.5 |

The glass fibers preferred are formed by mechanical attenuation from small orifices in a glass fiber forming bushing in a direct melt operation, although a marble melt operation could also be used. The physical properties of the glass including temperatures corresponding to the high temperature viscosity from about log 2.0 to about log 5.0 along with the softening point temperature, liquidus temperature, density and refractive index (bulk) are as shown in Table 3 as compared to a 621 glass below:

TABLE 3

| | Log Viscosity (°F.) | Preferred Embodiment | 621 |
|---|---|---|---|
| | 2.0 | 2576 | 2521 |
| | 2.5 | 2376 | 2332 |
| | 3.0 | 2218 | 2181 |
| | 4.0 | 1984 | 1956 |
| | 5.0 | 1818 | 1795 |
| (Softening point) | 7.65 | 1547 | 1532 |
| Liquidus Temp. (°F.) | | 1970 | 1925 |
| Density (g/cc) | | 2.603 | 2.61 |
| Refractive Index (Bulk) | | 1.556 | 1.5625 |

These glass fibers were tested for refractive index by using an optical microscope and matching index oils and yielded a refractive index of about 1.556. These glass fibers were sized with the aqueous chemical treating composition specified above in Table 2. These glass fibers were produced as direct draw roving and were dried at the aforementioned temperatures to reduce the moisture content. The dried glass fibers are subsequently chopped in a glass fiber reinforced polymeric panel line using acrylic panel polymers to yield panels that are unhazy, translucent and of a bluish hue.

The invention is further illustrated by the following nonexclusive examples.

Table I presents data of seven glass fiber compositions prepared as glass fibers in the manner of the preferred embodiment. Properties of the seven glass fibers given in Table I include: refractive index, density and viscosity.

TABLE I

| Glass Components % Weight | Eg. 1 | Eg. 2 | Eg. 3 | Eg. 4 | Eg. 5 | Eg. 6 | Eg. 7 |
|---|---|---|---|---|---|---|---|
| $SiO_2$ | 55.1 | 55.6 | 55.0 | 54.9 | 55.4 | 54.9 | 56.3 |
| $Al_2O_3$ | 14.7 | 14.7 | 15.3 | 14.6 | 14.7 | 15.2 | 14.9 |
| CaO | 22.2 | 21.6 | 21.6 | 22.1 | 21.6 | 21.6 | 20.3 |
| $B_2O_3$ | 5.2 | 5.2 | 5.1 | 5.1 | 5.1 | 5.1 | 5.3 |
| $Na_2O$ | 1.0 | 1.1 | 1.1 | 1.4 | 1.4 | 1.4 | 1.5 |
| $F_2$ | 0.6 | 0.6 | 0.6 | 0.6 | 0.6 | 0.6 | 0.5 |
| Properties of Glass Refractive Index (nD) | 1.5595 | 1.5565 | 1.558 | 1.558 | 1.557 | 1.558 | 1.5527 |
| Density gm/cc | 2.624 | 2.616 | 2.618 | 2.623 | 2.616 | 2.618 | 2.610 |
| Viscosity log (°F.) | | | | | | | |
| 2.0 | 2563 | 2562 | 2561 | — | 2576 | — | — |
| 2.5 | 2367 | 2361 | 2360 | — | 2376 | — | — |
| 3.0 | 2212 | 2203 | 2203 | — | 2218 | — | — |
| 4.0 | 1984 | 1972 | 1974 | — | 1984 | — | — |
| 5.0 | 1825 | 1811 | 1814 | — | 1818 | — | — |
| 7.65 | 1566 | 1552 | 1559 | — | — | — | — |

TABLE II

| Batch Composition Sample | Sand | Clay | Limestone | Boric Acid | Flurospar | Salt Cake | Soda Ash |

TABLE II-continued

| | | | | | | | |
|---|---|---|---|---|---|---|---|
| Example 1 (kg) | 1131 | 1107 | 1010 | 301 | 63.4 | 13.8 | 55.0 |
| Example 2 (kg) | 1131 | 1107 | 1045 | 301 | 63.4 | 11.3 | 56.8 |
| Glass Fiber Composition | $SiO_2$ | CaO | $Al_2O_3$ | $B_2O_3$ | $Na_2O$ | $F_2$ | |
| Example 1 weight percent | 56.3 | 20.3 | 14.9 | 5.3 | 1.5 | 0.5 | |
| Example 2 weight percent | 56.0 | 20.8 | 14.8 | 5.2 | 1.5 | 0.5 | |

| Glass Fiber Properties | Refractive Index | Softening Point °F./°C. | Density gm/cc |
|---|---|---|---|
| Example 1 | 1.5530–1.5570 | 1603.9/873.3 – 1609.5/876.4 | 2.6018–2.5957 |
| Example 2 | 1.5530–1.5550 | 1609/1611.7 – 876.2/877.1 | 2.5970–2.6042 |

Table II shows two batch compositions which when formed from orifices in a bushing by mechanical attenuation resulted in the two indicated glass fiber compositions which had the various indicated properties.

The pristine strength of the glass fiber formed with the glass fiber composition of the preferred embodiment was tested both before and after 16 hours in 1 Normal sulphuric acid. The pristine strength test was conducted in the usual manner known in the art, and the results of the test indicated that the glass appears to have a similar acid resistance as that of the 621 glass. So the higher alkali content of the glass fiber composition would not affect the durability of the glass fibers are compared to glass fibers of the 621 glass composition.

The electrical properties of the glass fiber composition of the preferred embodiment were compared to the electrical properties of glass fibers of 621 glass with a 5.8% $B_2O_3$ content as shown in Table III. These tests of breakdown voltage, dielectric constant, volume resistivity, and surface resistivity were performed in accordance with standard procedures known to those skilled in the art.

TABLE III

ELECTRICAL PROPERTIES OF PREFERRED EMBODIMENT GLASS AND 621 GLASS

| | Glass of Invention | 621 Glass (5.8% $B_2O_3$) |
|---|---|---|
| Breakdown Voltage (V/mil) | 314 | 283 |
| @ 60 Hz   dielectric constant | 7.07 | 7.33 |
| dissipation factor | 0.007 | 0.006 |
| loss index | 0.049 | 0.044 |
| @ $10^6$ Hz   dielectric constant | 6.68 | 6.90 |
| dissipation factor | 0.002 | 0.002 |
| loss index | 0.013 | 0.014 |
| Volume Resistivity (ohm cm) | $1.63 \times 10^{15}$ | $2.18 \times 10^{15}$ |
| Surface Resistivity (ohm cm) | $1.38 \times 10^{15}$ | $7.79 \times 10^{14}$ |

From Table III, similar electrical properties are noted for the glass fibers of the present invention and for fibers of 621-glass. From Table III it is evident that the higher alkali level does not adversely affect the electrical properties and no significant differences are noticable between the glass fiber composition of the present invention and glass fiber compositions of 621 glass.

Glass fiber reinforced panels were prepared using 621-glass versus the glass fibers of the preferred embodiment. Both glass fibers were sized with the aqueous sizing composition similar to that of U.S. Pat. No. 4,110,094 where the aqueous composition included 4,4′ isopropylidene diphenol bisphenol-A-type epoxy resin, a reaction product of a partial ester of maleic anhydride and an epoxy resin containing one or more unesterified carboxyl groups and containing more than one epoxy, a propylene glycol-ethylene oxide surfactant (F-108 surfactant), hydrogenated corn oil (Pureco® oil), polyethylene glycol emulsifier (Triton® X-100), octylphenoxypolyethylene oxyethanol, polyvinyl pyrrolidone film former, ethacryloxypropyltrimethoxy silame, acetic acid, fatty acid amine salt as a glass fiber lubricant (Emery 6717) and sufficient water to give a solids content in the range of about 6.5±0.2 percent. Panels were formed with the dried chopped glass fiber strands of panel roving using polyester panel resin available from U.S. Steel Chemical Corporation. The panels were formed identically for the 621 glass and the glass of the preferred embodiment by an art recognized procedure.

From Table IV, the glass fibers of the present invention as specified in the preferred embodiment had mechanical properties at least as good as the 621 glass fibers in panels, and the higher cloudiness in the color data is due to the greater amount of reflected light from the panel.

TABLE IV

| Samples | Flexural Strength ($10^3$ psi) Dry/Wet | Strength Retention % | Flexural Modulus $10^6$ psi Dry/Wet | Glass Content % | Tensile Strength $10^3$ psi Dry/Wet | Strength Retention % | Color |
|---|---|---|---|---|---|---|---|
| 621 glass reinforced panels | 24.7/24.4 | 98.8 | .942/.953 | 22.7 | 12.7/11.8 | 92.9 | Blue, Trace of Pink |
| Preferred embodiment glass fiber reinforced panels | 28.8/23.6 | 81.9 | 1.18/1.02 | 22.3 | 13.7/13.8 | 101[1] | Blue, Slightly Cloudy |

[1]Anomolous value due to increased cure of test specimen during water boil cycle.

While the invention has been described with reference to certain specific embodiments, it is not intended that it be limited thereby except insofar as appears in the accompanying claims.

I claim:

1. A glass fiber having a reduced boron content for reinforcing polyester polymers to give a cured, glass fiber reinforced polyester article that has a bluish tint and that is unhazy consisting essentially of: in weight percent 55 to 56.5 $SiO_2$; 14.5 to 15.5 $Al_2O_3$; 20 to 23 CaO; 5 to 5.8 weight percent $B_2O_3$; 1 to 1.5 $R_2O$, where R is an alkali metal and 0.4 to 0.6 weight percent $F_2$ and having a refractive index in the range of greater than 1.5495 up to 1.557 and having a high temperature viscosity log n (°F.) 2.0 to 5.0 of 2576 to 1818.

2. Glass fiber composition of claim 1, which includes in weight percent one or more of the compounds selected from the group consisting of up to 0.6 percent $TiO_2$, and up to 0.3 MgO, and up to 0.3 $Fe_2O_3$.

3. Glass fiber composition of claim 1, wherein the refractive index is in the range of 1.553 to 1.557.

4. Glass fiber composition of claim 1, wherein the following components are present in the following weight percentage amounts: silica 55.8, calcium oxide 21, aluminum oxide 14.8, boric oxide 5.2, sodium oxide 1.4 and fluorine 0.5.

5. Glass fiber of claim 1, wherein the combined amount of $SiO_2$ and $Al_2O_3$ is in the range of 69.5 to 72 weight percent.

6. Glass fiber composition of claim 1 which has a liquidus temperature of 1970° F.

7. Glass fiber composition of claim 1, wherein the high temperature viscosity log at (°F.) is 2.0 to 3.0 at a temperature in the range of 2576° F. to 2218° F.

8. The glass fiber of claim 1 wherein the amount of $R_2O$ is in the range of greater than 1-1.5 weight percent.

* * * * *